(12) United States Patent
Meng et al.

(10) Patent No.: US 11,964,624 B2
(45) Date of Patent: Apr. 23, 2024

(54) AUTOMOTIVE FRONT SEAT OVERHEAD AIRBAG AND AUTOMOBILE

(71) Applicant: Autoliv Development AB, Vargarda (SE)

(72) Inventors: Qiang Meng, Shanghai (CN); Jianfei Ma, Shanghai (CN); Ting Wang, Shanghai (CN)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 17/757,997

(22) PCT Filed: Dec. 2, 2020

(86) PCT No.: PCT/CN2020/133233
§ 371 (c)(1),
(2) Date: Jun. 24, 2022

(87) PCT Pub. No.: WO2021/135794
PCT Pub. Date: Jul. 8, 2021

(65) Prior Publication Data
US 2023/0015426 A1    Jan. 19, 2023

(30) Foreign Application Priority Data
Dec. 31, 2019 (CN) .......................... 201911412993.2

(51) Int. Cl.
*B60R 21/213* (2011.01)
*B60R 21/231* (2011.01)
(Continued)

(52) U.S. Cl.
CPC .......... *B60R 21/213* (2013.01); *B60R 21/232* (2013.01); *B60R 21/235* (2013.01);
(Continued)

(58) Field of Classification Search
CPC ... B60R 21/213; B60R 21/214; B60R 21/231; B60R 21/232; B60R 21/233;
(Continued)

(56) References Cited

U.S. PATENT DOCUMENTS 6,283,500 B1 * 9/2001 Eckert .................. B60R 21/232
280/743.1
6,460,878 B2 * 10/2002 Eckert ................. B60R 21/2342
280/743.1
(Continued)

FOREIGN PATENT DOCUMENTS

CN      103029673 A     4/2013
CN      103029673 A     4/2013
(Continued)

*Primary Examiner* — Laura Freedman
(74) *Attorney, Agent, or Firm* — Foley & Lardner LLP

(57) ABSTRACT

An automotive front seat overhead airbag includes a supporting air chamber and a protective air chamber mounted on a roof. The supporting air chamber is inflated from the roof towards a dashboard upon inflation. The protective air chamber is in communication with the supporting air chamber. After the supporting air chamber is inflated, the protective air chamber is inflated from the supporting air chamber towards the human body. A first protective space is reserved between the supporting air chamber and the protective air chamber on a side facing the human body. The first protective space corresponds to the head of the human body for protecting the head and neck of the human body. An automobile includes a roof and a dashboard, and further includes the automotive front seat overhead airbag described above. An upper end of the supporting air chamber is connected to a gas generator.

14 Claims, 4 Drawing Sheets

(51) Int. Cl.
B60R 21/232 (2011.01)
B60R 21/235 (2006.01)

(52) U.S. Cl.
CPC ............... *B60R 2021/23192* (2013.01); *B60R 2021/23576* (2013.01)

(58) Field of Classification Search
CPC .......... B60R 21/235; B60R 2021/0048; B60R 2021/161; B60R 2021/23107; B60R 2021/23192; B60R 2021/23308; B60R 2021/23316; B60R 2021/23324; B60R 2021/23576
See application file for complete search history.

(56) References Cited

U.S. PATENT DOCUMENTS

| | | | | |
|---|---|---|---|---|
| 6,722,691 | B1* | 4/2004 | Håland et al. | B60R 21/233 280/743.2 |
| 6,932,380 | B2* | 8/2005 | Choi | B60R 21/232 280/730.1 |
| 7,926,840 | B1* | 4/2011 | Choi | B60R 21/214 280/730.1 |
| 7,997,615 | B2* | 8/2011 | Jang | B60R 21/2338 280/743.1 |
| 8,240,706 | B2* | 8/2012 | Bustos Garcia | B60R 21/261 280/728.2 |
| 8,403,358 | B2* | 3/2013 | Choi | B60R 21/214 280/743.2 |
| 8,414,017 | B2* | 4/2013 | Lee | B60R 21/231 280/743.1 |
| 8,579,321 | B2* | 11/2013 | Lee | B60R 21/233 280/729 |
| 8,807,593 | B2* | 8/2014 | Lee | B60R 21/213 280/730.1 |
| 9,180,832 | B2* | 11/2015 | Le Norcy | B60R 21/2342 |
| 9,533,650 | B2* | 1/2017 | Le Norcy | B60R 21/231 |
| 9,771,049 | B2* | 9/2017 | Lee | B60R 21/213 |
| 10,246,043 | B2* | 4/2019 | Schneider | B60R 21/235 |
| 10,293,777 | B2* | 5/2019 | Paxton | B60R 21/239 |
| 10,525,927 | B2* | 1/2020 | Fischer | B60R 21/231 |
| 10,583,799 | B2* | 3/2020 | Schneider | B60R 21/2338 |
| 10,857,965 | B2* | 12/2020 | Abe | B60R 21/214 |
| 10,960,844 | B2* | 3/2021 | Jimenez | B60R 21/213 |
| 11,230,253 | B2* | 1/2022 | Hellot | B60R 21/239 |
| 11,560,117 | B2* | 1/2023 | Navarro Arranz | B60R 21/214 |
| 11,623,603 | B2* | 4/2023 | Zhou | B60R 21/232 280/730.1 |
| 2004/0239082 | A1* | 12/2004 | Schneider | B60R 21/264 280/736 |
| 2005/0070414 | A1* | 3/2005 | Schneider | B60R 21/237 493/405 |
| 2012/0080869 | A1 | 4/2012 | Lee et al. | |
| 2018/0001863 | A1 | 1/2018 | Nakanishi et al. | |

FOREIGN PATENT DOCUMENTS

| | | |
|---|---|---|
| CN | 207000393 U | 2/2018 |
| CN | 207000393 U | 2/2018 |
| CN | 207328369 U | 5/2018 |
| CN | 207328369 U | 5/2018 |
| CN | 109415889 A | 3/2019 |
| CN | 110466469 A | 11/2019 |
| CN | 110466469 A | 11/2019 |
| EP | 3 483 012 A1 | 5/2019 |
| EP | 3483012 A1 | 5/2019 |

* cited by examiner

AUTOMOTIVE FRONT SEAT OVERHEAD AIRBAG AND AUTOMOBILE

TECHNICAL FIELD

The present invention relates to the technical field of airbags, and particularly relates to an automotive front seat overhead airbag and an automobile.

BACKGROUND

Existing automotive front seat overhead airbags are unable to protect children in an out of position (OOP) condition from serious injuries. Conventional overhead airbags can cause very severe injuries to the neck and head of a dummy without a seat belt load.

It is therefore necessary to design an automotive front seat overhead airbag and an automobile capable of protecting children in an out of position condition and passengers without a seat belt load from injuries.

SUMMARY

Aiming at overcoming the disadvantages of the prior art, the present invention provides an automotive front seat overhead airbag and an automobile capable of protecting children in an out of position condition and passengers without a seat belt load from injuries.

The technical solution of the present invention provides an automotive front seat overhead airbag, comprising a supporting air chamber and a protective air chamber mounted on a roof.

The supporting air chamber is inflated from the roof towards a dashboard upon inflation.

The protective air chamber is in communication with the supporting air chamber. After the supporting air chamber is inflated, the protective air chamber is inflated from the supporting air chamber towards the human body.

A first protective space is reserved between the supporting air chamber and the protective air chamber on a side facing the human body. The first protective space corresponds to the head of the human body for protecting the head and neck of the human body.

Further, the supporting air chamber comprises a first air chamber and a second air chamber.

The protective air chamber comprises a third air chamber and a fourth air chamber. The first air chamber and the second air chamber are connected at upper ends thereof, and then separate and extend therefrom to respectively connect to outer sides of the third air chamber and the fourth air chamber. Inner sides of the third air chamber and the fourth air chamber are in communication with each other.

The first protective space is formed between extended sections of the first air chamber and the second air chamber and sides of the third air chamber and the fourth air chamber facing the human body.

Further, the first air chamber and the second air chamber are both tubular, and extend downward from the roof along a windshield upon inflation.

Further, lower ends of the first air chamber and the second air chamber abut the dashboard upon inflation. Middle sections of the first air chamber and the second air chamber are in communication with the third air chamber and the fourth air chamber.

Further, a first air inlet hole is provided between the middle section of the first air chamber and the third air chamber. A second air inlet hole is provided between the middle section of the second air chamber and the fourth air chamber.

Further, a circle of sewing thread at a junction of the inner sides of the third air chamber and the fourth air chamber is located on a vertical plane. The length of the sewing thread is less than the maximum perimeter of the third air chamber and that of the fourth air chamber.

Further, a connecting sheet is further arranged at the junction of the inner sides of the third air chamber and the fourth air chamber, and is provided with a plurality of air holes in communication with the third air chamber and the fourth air chamber. An edge of the connecting sheet is sewn to the third air chamber and the fourth air chamber to form the sewing thread.

Further, a second protective space for reducing injuries caused to children is reserved between the supporting air chamber and the protective air chamber on a side away from the human body.

Further, the supporting air chamber comprises a first air chamber and a second air chamber. The first air chamber and the second air chamber are connected at upper ends thereof, and then separate and extend therefrom to respectively connect to an outer side of the protective air chamber.

The second protective space is reserved between lower ends of the first air chamber and the second air chamber and the protective air chamber on a side away from the human body.

The present invention also provides an automobile, comprising a roof and a dashboard, and further comprising the automotive front seat overhead airbag as described in any of the foregoing. An upper end of the supporting air chamber is connected to a gas generator.

The above technical solution can achieve the following beneficial effects:

A first protective space is reserved between a supporting airbag and a protective airbag on a side facing the human body in the present invention. The first protective space corresponds to the head of the human body for protecting the head and neck of the human body. The first protective space provides a sufficient cushioning space for the head of the human body, such that the head of the human body will sink into the first protective space after a forward collision, thereby protecting the neck and the head from severe injures under the condition of no seat belt load.

BRIEF DESCRIPTION OF THE DRAWINGS

The disclosure of the present invention will become better understood with reference to the accompanying drawings. It should be understood that these drawings are for illustrative purposes only and are not intended to limit the scope of protection of the present invention. In the drawings.

REFERENCE NUMERALS

Figure 1:
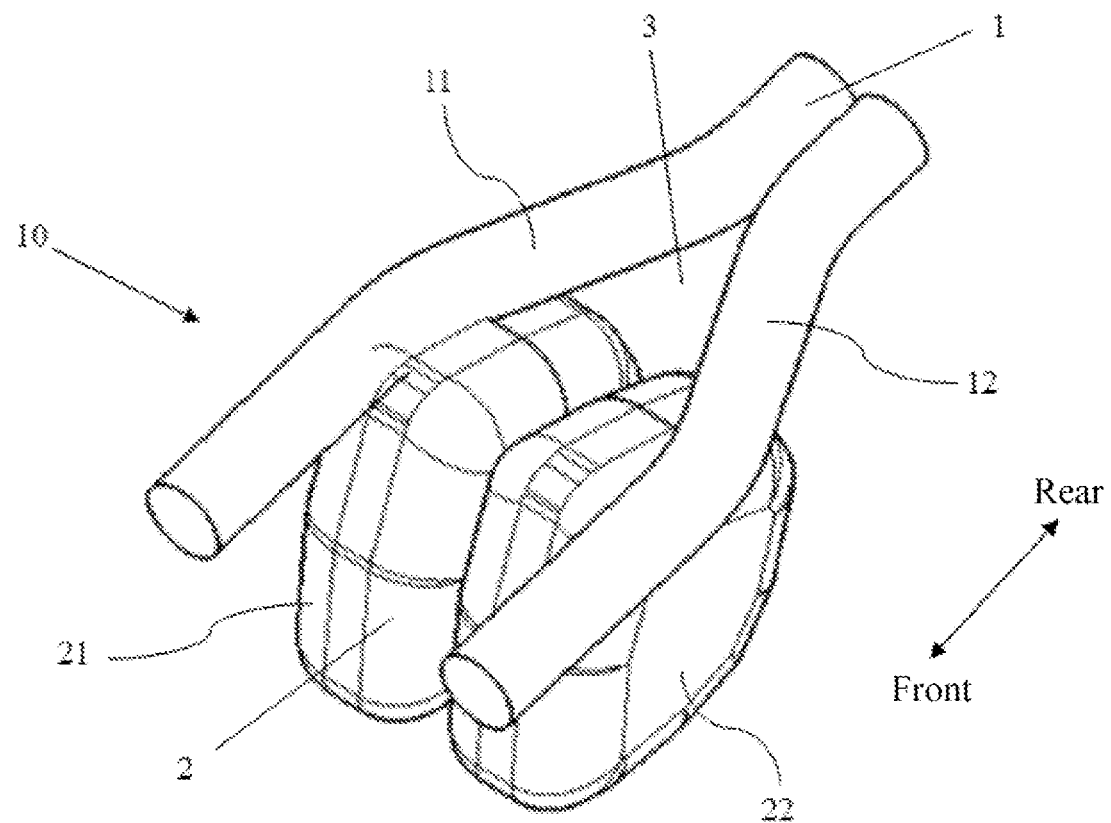
FIG. 1 is a perspective view of an automotive front seat overhead airbag according to an example of the present invention.

Human body 100, automotive front seat overhead airbag 10, roof dashboard windshield 40;
Supporting air chamber 1: first air chamber 11, second air chamber 12;
Protective air chamber 2: third air chamber 21, fourth air chamber 22;
First protective space 3, sewing thread 4, second protective space 6;
Connecting sheet 5: air hole 51.

DETAILED DESCRIPTION

Specific embodiments of the present invention are described further below with reference to the accompanying drawings.

It may be easily understood that those of ordinary skills in the art may propose a plurality of interchangeable structural modes and implementation methods according to the technical solutions of the present invention without changing the essential spirit of the present invention. Therefore, the following specific embodiments and the accompanying drawings are merely exemplary description of the technical solutions of the present invention, and should not be regarded as the whole of the present invention or regarded as limitations to the technical solutions of the present invention.

The positional terms of up, down, left, right, before, behind, front, back, top, bottom, etc. which are referred to or possibly referred to in this specification are defined with respect to the configurations shown in the drawings, and they are relative concepts; therefore, they may possibly change correspondingly according to different positions thereof and different use states. Therefore, these or other positional terms should not be construed as restrictive terms. Specifically, "before" and "behind" in the present invention are based on the orientation of the entire automobile.

As shown in FIG. 1, an automotive front seat overhead airbag 10 includes a supporting air chamber 1 and a protective air chamber 2 mounted on a roof.

The supporting air chamber 1 is inflated from the roof towards a dashboard upon inflation.

The protective air chamber 2 is in communication with the supporting air chamber 1. After the supporting air chamber 1 is inflated, the protective air chamber 2 is inflated from the supporting air chamber 1 towards the human body 100.

A first protective space 3 is reserved between the supporting air chamber 1 and the protective air chamber 2 on a side facing the human body 100. The first protective space 3 corresponds to the head of the human body for protecting the head and neck of the human body 100.

Specifically, as shown in FIG. 1, an upper end of the supporting air chamber 1 is directly connected to a gas generator. The supporting air chamber 1 feeds gas from the gas generator to the protective air chamber 2. Therefore, the supporting air chamber 1 is configured to guide gas and support the protective air chamber 2, such that the protective air chamber 2 can be rapidly inflated towards the human body 100 to protect the human body 100.

The automotive front seat overhead airbag 10 is folded and stored in the roof before being inflated. When the automobile is subjected to a forward collision, the gas generator inflates the automotive front seat overhead airbag 10. First, the supporting air chamber 1 is inflated. The supporting air chamber 1 is ejected from the roof and is inflated obliquely downward and forward (towards the head). After the supporting air chamber 1 is inflated, the protective air chamber 2 starts to be inflated. The protective air chamber 2 is inflated towards the human body 100 from the front of the human body.

Figure 3:
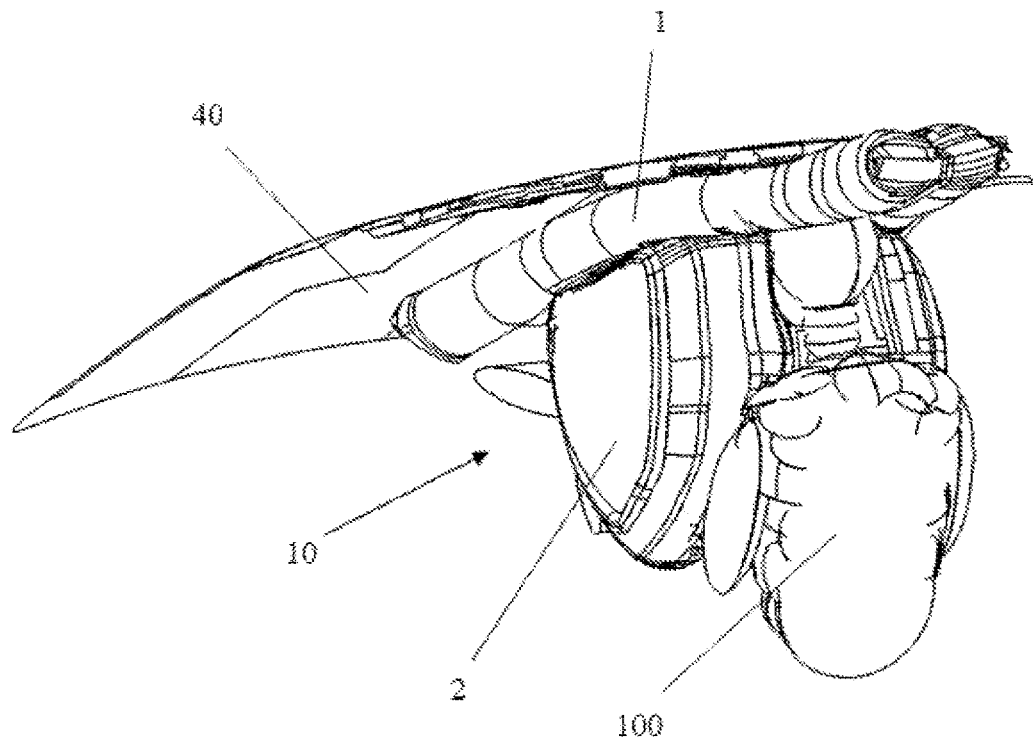
FIG. 3 is a diagram showing an automotive front seat overhead airbag in a use state according to an example of the present invention.
Figure 4:
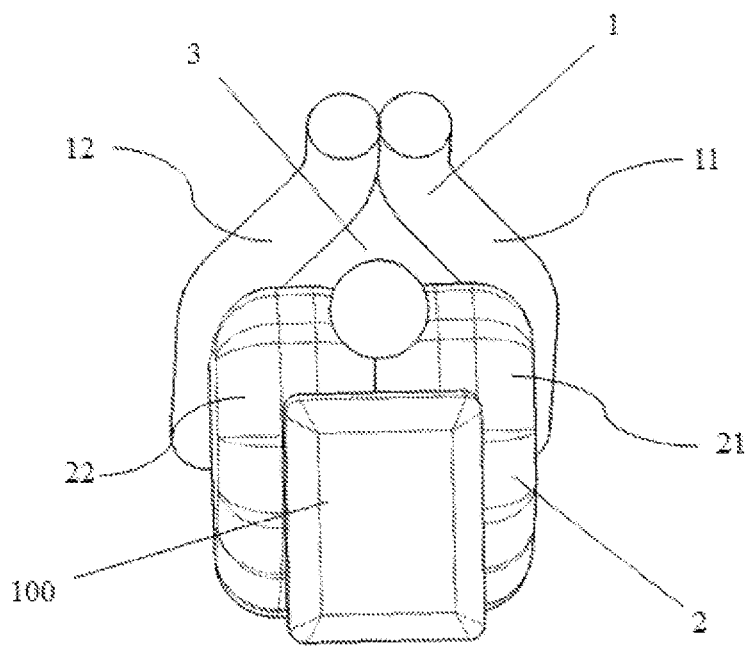
FIG. 4 is a rear view of an automotive front seat overhead airbag in a use state according to an example of the present invention.

In this example, as shown in FIGS. 3-4, a first protective space 3 is formed between the supporting air chamber 1 and the protective air chamber 2. The first protective space 3 is located on a side facing the human body 100, i.e., on a side facing the rear of an automobile body. When the human body 100 is subjected to a forward collision, the protective air chamber 2 is in contact with the chest of the human body. The head of the human body sinks into the first protective space 3. The first protective space 3 provides a cushioning space for the head and neck of the human body under the condition of no seat belt load, so as to reduce injuries caused to the neck and the head.

Further, as shown in FIG. 1, the supporting air chamber 1 includes a first air chamber 11 and a second air chamber 12.

The protective air chamber 2 includes a third air chamber 21 and a fourth air chamber 22. The first air chamber 11 and the second air chamber 12 are connected at upper ends thereof, and then separate and extend therefrom to respectively connect to outer sides of the third air chamber 21 and the fourth air chamber 22. Inner sides of the third air chamber 21 and the fourth air chamber 22 are in communication with each other.

The first protective space 3 is formed between extended sections of the first air chamber 11 and the second air chamber 12 and sides of the third air chamber 21 and the fourth air chamber 22 facing the human body.

The upper ends of the first air chamber 11 and the second air chamber 12 are directly connected to the gas generator. The gas generator performs inflation starting from the upper ends of the first air chamber 11 and the second air chamber 12. Lower ends of the first air chamber 11 and the second air chamber 12 are closed ends and extend to the dashboard.

The first air chamber 11 and the second air chamber 12 are connected at the upper ends thereof and then separate to form structures similar to tree branches. After separation, the first air chamber 11 and the second air chamber 12 are connected to outer sides of the third air chamber 21 and the fourth air chamber 22 respectively.

"Outer side" and "inner side" here are relative to the centers of the third air chamber and the fourth air chamber. "Outer side" is located away from the centers of the two air chambers. "Inner side" is located close to the centers of the two air chamber.

The first air chamber 11 and the second air chamber 12 are connected to the outer sides of the third air chamber 21 and the fourth air chamber 22, so as to increase the size of the first protective space 3.

The first protective space 3 is located between extended sections of the first air chamber 11 and the second air chamber 12 and sides of the third air chamber 21 and the fourth air chamber 22 facing the human body and has a shape similar to a rhombus shape. When the human body is subjected to a forward collision, the head of the human body moves forward and sinks into the first protective space 3 under the condition of no seat belt load. The first protective space 3 provides a sufficient cushioning space for the head and neck of the human body.

Since the protective air chamber 2 includes two air chambers, good performance can be achieved under the conditions of 90 Km/h oblique moving deformation barrier (90 OMDB) and 64 Km/h small overlap barrier (64 SOB).

Alternatively, the shape of the first protective space 3 is not limited to the shape presented in this example.

Optionally, if the widths of the third air chamber 21 and the fourth air chamber 22 in a left-right direction of the automobile body are sufficient, the first air chamber 11 and the second air chamber 12 can also separate and extend to connect to top portions of the third air chamber 21 and the fourth air chamber 22.

Further, as shown in FIGS. 1 and 3, the first air chamber 11 and the second air chamber 12 are both tubular, and extend downward from the roof along a windshield 40 upon inflation.

The first air chamber 11 and the second air chamber 12 extend obliquely downward and forward from the roof along the windshield 40 towards the dashboard. This inflation path facilitates rapid inflation of the first air chamber 11 and the second air chamber 12. After the first air chamber 11 and the second air chamber 12 are inflated, upper surfaces thereof abut the windshield 40. The protective air chamber 2 can be stably supported by means of the windshield 40.

Optionally, the first air chamber 11 and the second air chamber 12 may also have a flat tubular shape or a rectangular tubular shape.

Further, as shown in FIG. 1, lower ends of the first air chamber 11 and the second air chamber 12 abut the dashboard upon inflation. Middle sections of the first air chamber 11 and the second air chamber 12 are in communication with the third air chamber 21 and the fourth air chamber 22.

Since the lower ends of the first air chamber 11 and the second air chamber 12 abut the dashboard upon inflation, the first air chamber 11 and the second air chamber 12 are held between the roof and the dashboard to stably support the protective air chamber 2.

Further, a first air inlet hole is provided between the middle section of the first air chamber 11 and the third air chamber 21. A second air inlet hole is provided between the middle section of the second air chamber 12 and the fourth air chamber 22.

Specifically, the first air chamber 11 supplies air to the third air chamber 21 by means of the first air inlet hole, and the second air chamber 12 supplies air to the fourth air chamber 22 by means of the second air inlet hole. The third air chamber 21 and the fourth air chamber 22 are in communication with each other to facilitate rapid inflation of the entire airbag.

Figure 5:
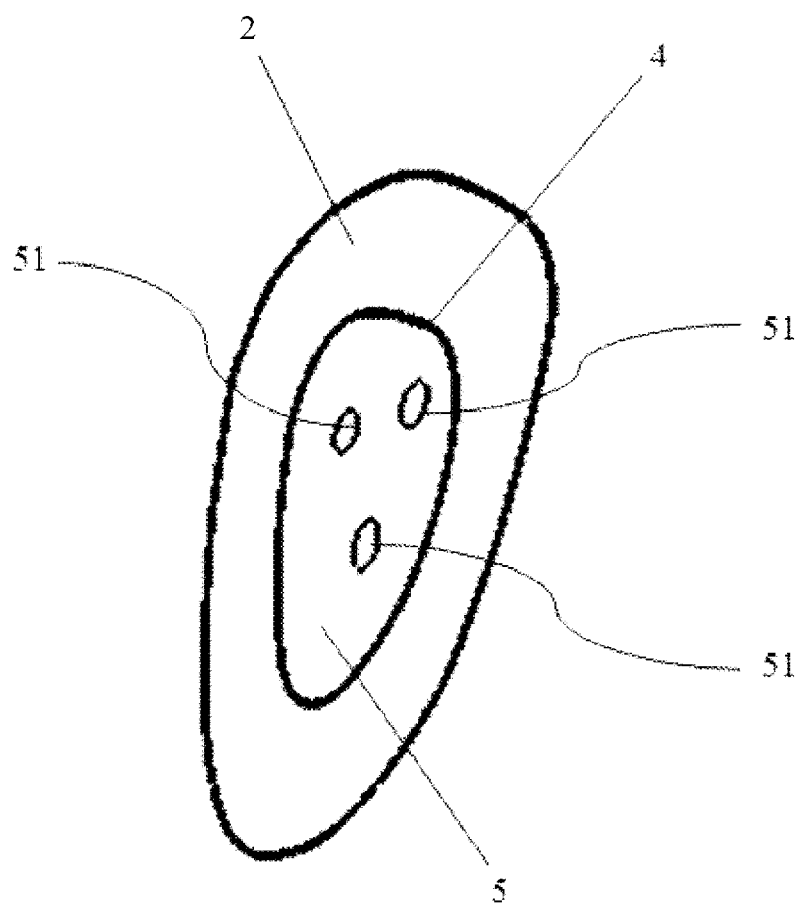
FIG. 5 is a cross-sectional view of a connecting sheet of an automotive front seat overhead airbag according to an example of the present invention.

Further, as shown in FIGS. 1 and 5, a circle of sewing thread 4 at a junction of the inner sides of the third air chamber 21 and the fourth air chamber 22 is located on a vertical plane. The length of the sewing thread 4 is less than the maximum perimeter of the third air chamber 21 and that of the fourth air chamber 22.

Specifically, the sewing thread 4 is a circle of closed thread between the third air chamber 21 and the fourth air chamber 22.

After being inflated, each of the third air chamber 21 and the fourth air chamber 22 has a shape similar to a loaf of bulged bread and is arranged in a vertical direction. The maximum perimeters of the third air chamber 21 and the fourth air chamber 22 along the vertical plane are greater than the length of the sewing thread 4 therebetween.

Therefore, the first protective space 3 has a recess structure formed on sides of the third air chamber 21 and the fourth air chamber 22 facing the human body 100. The recess structure and extended ends of the first air chamber 11 and the second air chamber 12 form a space having a shape similar to a rhombus shape.

When the head of the human body moves forwards at a high speed, the head sinks into the recess structure while being supported by the extended ends of the first air chamber 11 and the second air chamber 12. The recess structure cushions the head and the neck from an impact, and prevents the head from passing through the first protective space 3 when moving forwards.

Further, as shown in FIG. 5, a connecting sheet 5 is further arranged at the junction of the inner sides of the third air chamber 21 and the fourth air chamber 22. The connecting sheet 5 is provided with a plurality of air holes 51. The air holes 51 are in communication with the third air chamber 21 and the fourth air chamber 22. An edge of the connecting sheet 5 is sewn to the third air chamber 21 and the fourth air chamber 22 to form the sewing thread 4.

The plurality of air holes 51 enable a balance to be attained between air pressures of the third air chamber 21 and the fourth air chamber 22. The third air chamber 21 and the fourth air chamber 22 are inflated at the same time when possible.

Optionally, there may be one or more than two air holes 51 on the connecting sheet 5.

Optionally, the connecting sheet 5 is not provided, and the third air chamber 21 and the fourth air chamber 22 have openings on inner sides thereof and are connected by means of the sewing thread 4.

Figure 2:
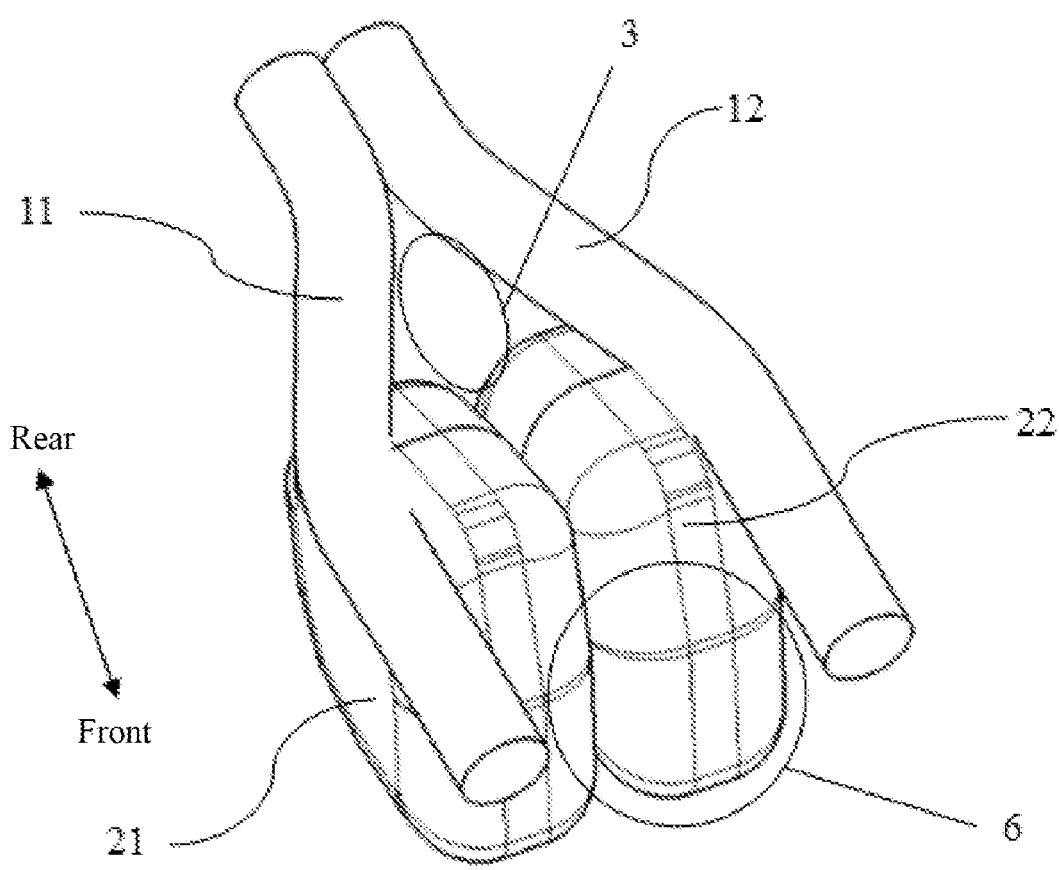
FIG. 2 is a perspective view of an automotive front seat overhead airbag according to an example of the present invention from another viewing angle.

Further, as shown in FIG. 2, a second protective space 6 is reserved between the supporting air chamber 1 and the protective air chamber 2 on a side away from the human body 100. The second protective space 6 is used for reducing injuries caused to children.

Specifically, the supporting air chamber 1 includes a first air chamber 11 and a second air chamber 12. The first air chamber 11 and the second air chamber 12 are connected at upper ends thereof, and then separate and extend therefrom to respectively connect to an outer side of the protective air chamber 2.

A second protective space 6 is reserved between lower ends of the first air chamber 11 and the second air chamber 12 and the protective air chamber 2 on a side away from the human body 100.

The second protective space 6 is located on a side close to a front region of an automobile. The lower ends of the first air chamber 11 and the second air chamber 12 define left and right boundaries of the second protective space 6. The protective air chamber 2 defines a rear boundary of the second protective space 6. An upper boundary of the second protective space 6 is the windshield 40. A front boundary is the dashboard.

The second protective space 6 is located on the front side of the protective air chamber 2. Upon occurrence of a forward collision, when the human body 100 hits against the protective air chamber 2, the protective air chamber 2 provides cushioning while exerting large reaction force to the human body 100. The second protective space 6 can enhance the cushioning performance of the protective air chamber 2. The protective air chamber 2 can deform towards the second protective space 6.

The above arrangement can reduce reaction force exerted by the protective air chamber 2 to children aged 3-6 years in out of position (OOP) condition, thereby avoiding serious injuries.

The present invention also provides an automobile. The automobile includes a roof and a dashboard, and further includes the automotive front seat overhead airbag 10. An upper end of the supporting air chamber 1 is connected to a gas generator.

The automotive front seat overhead airbag 10 in this example is mounted on the roof at a position above the passenger seat for protecting a passenger on the passenger seat.

In the American market, children aged 3-6 years are allowed to be seated on passenger seats. Therefore, the provision of the second protective space 6 in the automotive front seat overhead airbag 10 can meet the requirements of the American market. Meanwhile, the airbag can also provide protection to adults without a seat belt load in the Chinese market.

The above description is merely illustrative of the principles and preferred examples of the present invention. It should be noted that other variations can be made by those of ordinary skill in the art on the basis of the principles of the present invention, and such variations should be construed as falling within the scope of protection of the present invention.

The invention claimed is:

1. An automotive front seat overhead airbag, comprising a supporting air chamber and a protective air chamber mounted on a roof, wherein
    the supporting air chamber is inflated from the roof towards a dashboard upon inflation, wherein the supporting air chamber comprises a first air chamber and a second air chamber, wherein the first air chamber and the second air chamber are both tubular and extend downward from the roof along a windshield upon inflation, and wherein lower ends of the first air chamber and the second air chamber are configured to abut the dashboard upon inflation
    the protective air chamber is in communication with the supporting air chamber, after the supporting air chamber is inflated, the protective air chamber is configured to be inflated from the supporting air chamber towards an occupant, the protective air chamber comprises a third air chamber and a fourth air chamber, wherein the first air chamber and the second air chamber are connected at upper ends thereof and then separate and extend therefrom to respectively connect to outer sides of the third air chamber and the fourth air chamber, wherein inner sides of the third air chamber and the fourth air chamber are in communication with each other,
    a first protective space is configured to be reserved between extended sections of the first air chamber and the second air chamber of the supporting air chamber and the protective air chamber on a side configured to face the occupant, sides of the third air chamber and the fourth air chamber are configured to face the occupant, and the first protective space is configured to correspond to a head of the occupant for protecting the head and a neck of the occupant.

2. The automotive front seat overhead airbag according to claim 1, wherein middle sections of the first air chamber and the second air chamber are in communication with the third air chamber and the fourth air chamber.

3. The automotive front seat overhead airbag according to claim 2, wherein a first air inlet hole is provided between the middle section of the first air chamber and the third air chamber, and a second air inlet hole is provided between the middle section of the second air chamber and the fourth air chamber.

4. The automotive front seat overhead airbag according to claim 1, wherein a circle of sewing thread at a junction of the inner sides of the third air chamber and the fourth air chamber is located on a vertical plane, and the length of the sewing thread is less than the maximum perimeter of the third air chamber and that of the fourth air chamber.

5. The automotive front seat overhead airbag according to claim 4, wherein a connecting sheet is further arranged at the junction of the inner sides of the third air chamber and the fourth air chamber, the connecting sheet is provided with a plurality of air holes in communication with the third air chamber and the fourth air chamber, and an edge of the connecting sheet is sewn to the third air chamber and the fourth air chamber to form the sewing thread.

6. The automotive front seat overhead airbag according to claim 1, wherein a second protective space configured to reduce injuries caused to children is reserved between the supporting air chamber and the protective air chamber on a windshield-facing side of the front seat overhead airbag.

7. The automotive front seat overhead airbag according to claim 6, wherein
    the second protective space is reserved between lower ends of the first air chamber and the second air chamber and the protective air chamber on the windshield-facing side of the front seat overhead airbag.

8. An automobile, comprising a roof and a dashboard, and further comprising the automotive front seat overhead airbag according to claim 1, wherein an upper end of the supporting air chamber is connected to a gas generator.

9. The automobile according to claim 8, wherein middle sections of the first air chamber and the second air chamber are in communication with the third air chamber and the fourth air chamber.

10. The automobile according to claim 9, wherein a first air inlet hole is provided between the middle section of the first air chamber and the third air chamber, and a second air inlet hole is provided between the middle section of the second air chamber and the fourth air chamber.

11. The automobile according to claim 8, wherein a circle of sewing thread at a junction of the inner sides of the third air chamber and the fourth air chamber is located on a vertical plane, and the length of the sewing thread is less than the maximum perimeter of the third air chamber and that of the fourth air chamber.

12. The automobile according to claim 11, wherein a connecting sheet is further arranged at the junction of the inner sides of the third air chamber and the fourth air chamber, the connecting sheet is provided with a plurality of air holes in communication with the third air chamber and the fourth air chamber, and an edge of the connecting sheet is sewn to the third air chamber and the fourth air chamber to form the sewing thread.

13. The automobile according to claim 8, wherein a second protective space configured to reduce injuries caused to children is reserved between the supporting air chamber and the protective air chamber on a windshield-facing side of the front seat overhead airbag.

14. The automobile according to claim 13, wherein
    the second protective space is reserved between lower ends of the first air chamber and the second air chamber and the protective air chamber on the windshield-facing side of the front seat overhead airbag.

* * * * *